June 4, 1929.     R. D. TACKABERRY     1,715,435
FILTER
Filed Sept. 30, 1925     2 Sheets-Sheet 1

Inventor:
R. D. Tackaberry
by Geo. N. Goddard, atty.

June 4, 1929.  R. D. TACKABERRY  1,715,435
FILTER
Filed Sept. 30, 1925   2 Sheets-Sheet 2
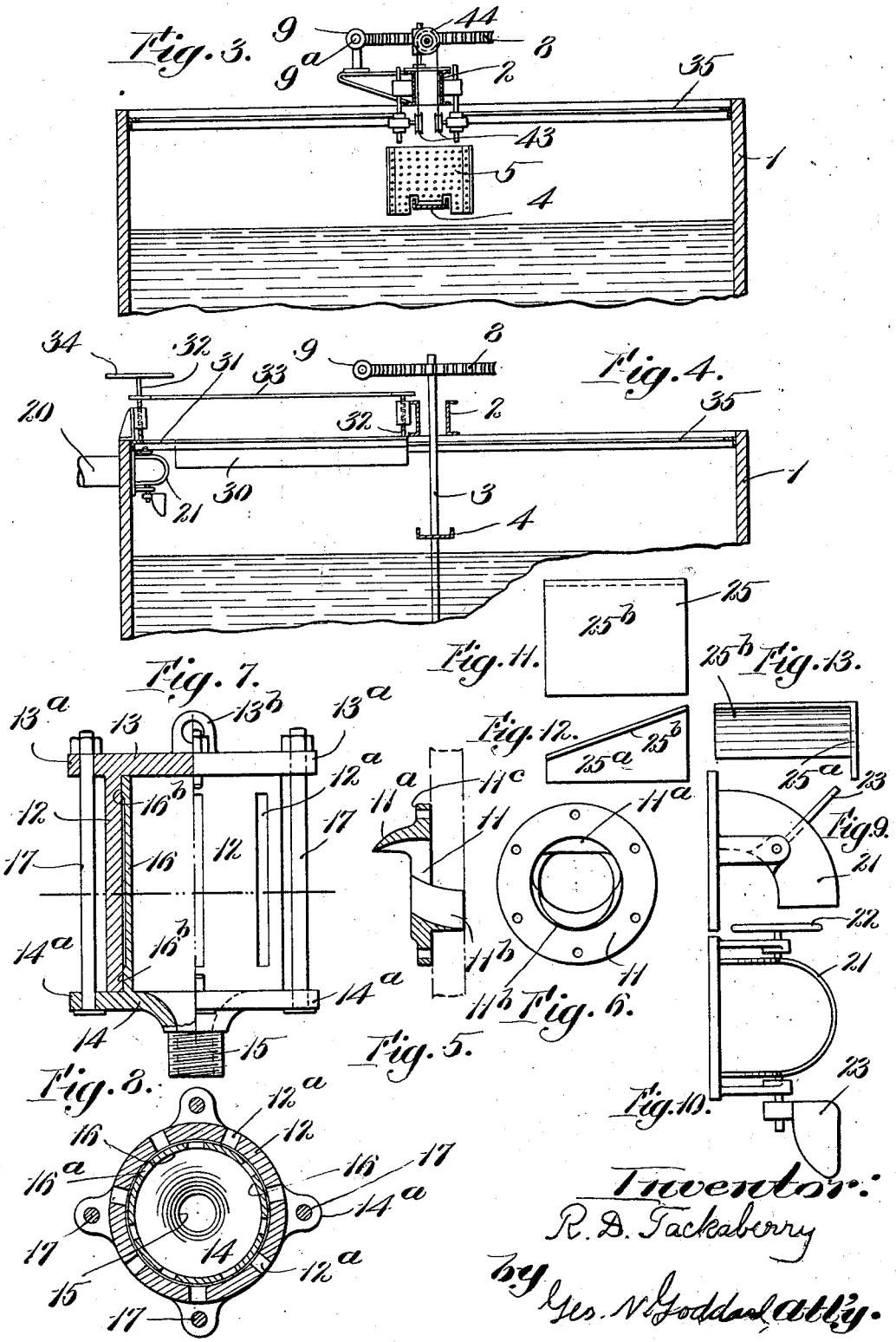
Inventor:
R. D. Tackaberry
by Geo. N. Goddard, Atty.

Patented June 4, 1929.

1,715,435

UNITED STATES PATENT OFFICE.

ROBERT DANIEL TACKABERRY, OF LEWISTON, MAINE.

FILTER.

Application filed September 30, 1925. Serial No. 59,561.

This invention relates to filtering apparatus, and is intended to improve the construction of such filters and provide simple and efficient means for permitting the rapid and effective filtering of large volumes of water or other liquid, and to provide convenient and efficient means for thoroughly washing out the filtering strainers and sand bed, after an accumulation of foreign particles separated from the liquid that has passed through.

An important feature of the present invention resides in the provision of a perforated or foraminous baffle plate arranged to receive the inflowing raw liquid from the supply nozzle and break it into spray and distribute it over the interior of the tank, without unduly agitating the body of liquid within the tank or stirring up the bed of sand through which the filtering takes place. Another feature of the invention consists in the provision of means for effectively removing the accumulated foreign matter by a washing operation, accompanied by the stirring or agitating of the liquid in such a way as to promote the escape of the foreign particles with the wash liquid. The invention also includes an improved construction of strainer or filter box which prevents the escape of the particles of sand, while allowing the effective seeping through of the filtered liquid. These and other features of the invention will be particularly described in the following specification and will be defined in the claims hereto annexed.

In the accompanying drawings I have illustrated a preferred embodiment of the principles comprising this invention, in which:

Figure 3 is a cross sectional view through the upper portion of the tank, showing a front elevation of the foraminous baffle plate and the driving mechanism for agitating the brake, the plane of said view being indicated by arrows $x$—$x$ on Figure 1.

Figure 4 is a vertical section on the plane $y$—$y$ of Figure 1, showing the wash liquid outlet and the skimmer mechanism.

Figures 5 and 6 are respectively vertical central sections and rear elevations of the supply nozzle which delivers the raw liquid against the baffle plate.

Figures 7 and 8 are detail views showing, in vertical elevation and horizontal section, the construction of filtering strainers.

Figures 9 and 10 are plan views and elevations, respectively, of the reversible scoop or elbow for guiding the wash liquid into the overflow pipe.

Figures 11, 12 and 13 are detail views of the deflecting plates shown, respectively, in plan and in elevational views at right angles to each other.

Figure 1:
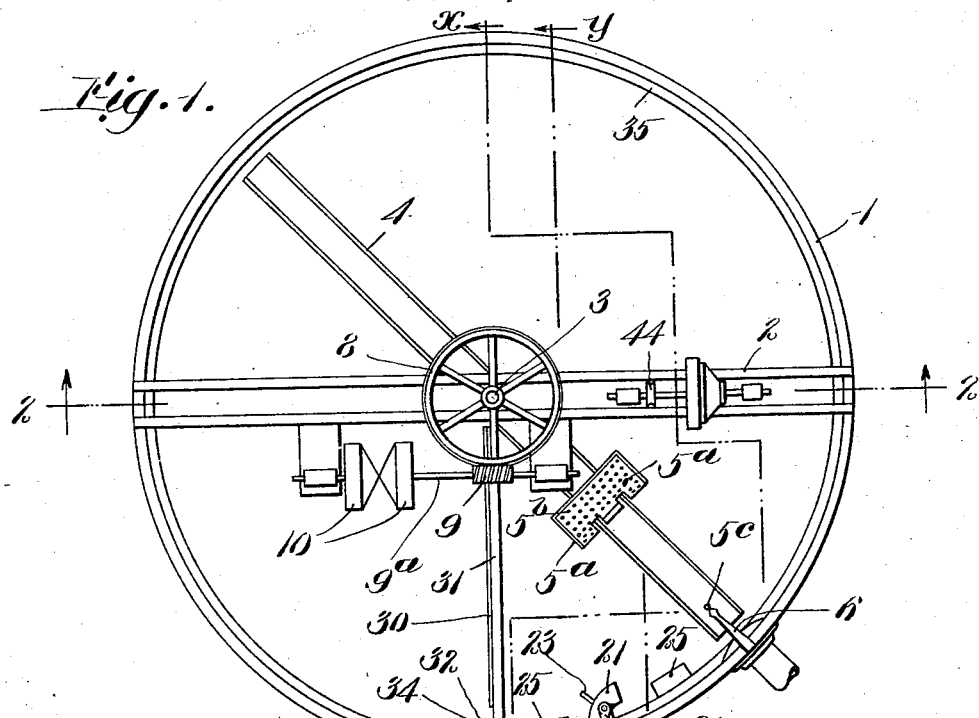
Figure 1 is a plan view of the filtering tank, showing the various apparatus for filtering the raw liquid and for washing the filtering appliances, from time to time, to get rid of the accumulated foreign matter.
Figure 2:
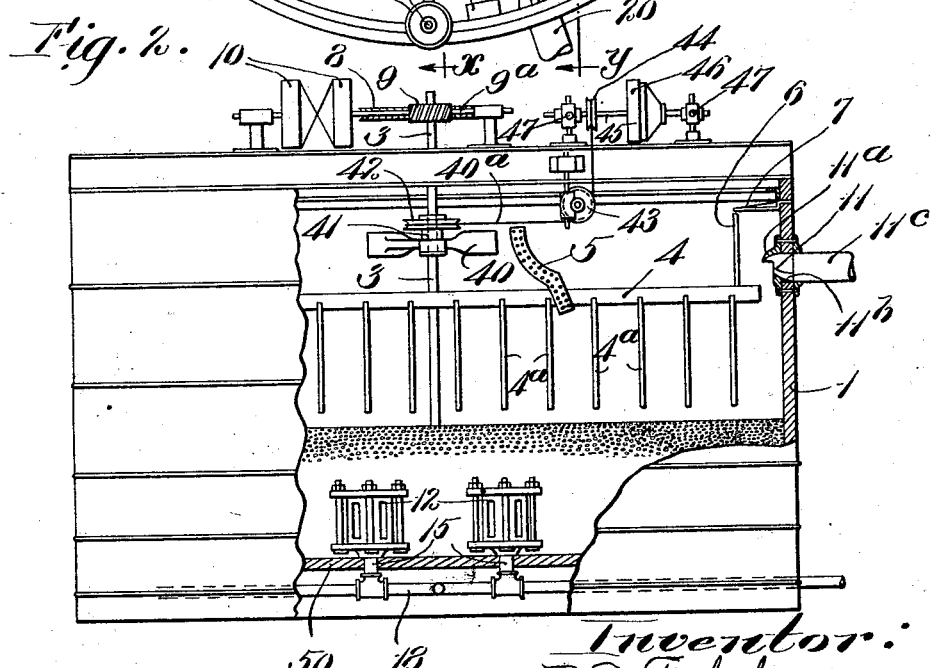
Figure 2 is a vertical view, partly in elevation and partly in section, of the apparatus shown in Figure 1 showing the arrangement of the sand bed agitating device and filtering strainers within the tank.

In the practice of this invention, according to the form illustrated in the drawings, I employ a tank, in this case, of cylindrical form, as shown at 1, provided with an overhead bridge rail or support 2, for carrying certain parts which extend diametrically across the tank.

A central shaft 3 acts as a support for the agitating rake and the centrifugal paddle during the washing operation. The rake comprises a channel-bar 4, mounted to extend diametrically across the inside of the tank and provided with downwardly projecting teeth $4^a$, which, when the rake is revolved by the overhead driving means, acts to stir up the sand and agitate the washing liquid which is introduced from the bottom, as will be hereinafter explained. At its upper end the central shaft 3 carries a worm gear 8 of relatively large diameter, which is driven by an intermeshing worm 9 on the horizontal drive shaft $9^a$, which can be driven in either direction by cross belt pulleys 10, alternately thrown into action by means of a reversing clutch of any suitable type, conventionally illustrated in the drawings.

On the rake-bar 4, intermediate of the middle axis and the outer end, is mounted a baffle plate or spraying element 5, comprising, as shown, a foraminous or closely perforated back-wall $5^b$, suitably curved or inclined to receive the liquid, and having side wings $5^a$, similarly perforated.

The supply pipe $11^c$, through which the raw liquid to be treated is delivered into the tank, is coupled into a nozzle 11, which is set into the side-wall of the tank at a suitable elevation. This nozzle is of peculiar formation and embraces a body portion in the form of an annular flange 11, with a forwardly projecting downwardly curved overhanging hood member 11ª, and a rearwardly extending underneath trough member 11ᵇ, the trough and the hood projecting on opposite sides of the central flange or body and, therefore, being in offset planes but having their inner curved surfaces somewhat converging so as to impart a definite direction to the inflowing column of liquid in order that it may be directed wholly against the baffle plate 5 which, with its numerous perforations, acts to break the column of inflowing liquid into a spray of such fine streams that it will not stir up the sand or sensibly agitate the body of liquid in the tank, as additional supplies of the liquid flow in. Hence, the inflowing liquid is distributed over the interior of the tank without an undue agitation or stirring up of the sand-bed.

The tank is provided, near its bottom, with a false bottom 50 above which are located any desired number of filtering strainers 12, so constructed as to permit the water that seeps through the sand-filter bed to escape into the off-take pipe 18, while preventing any sand from being carried along with the filtered water.

These filtering strainers are of very simple construction. As shown in Figures 7 and 8, they comprise an outer cylindrical member 12, having closed top plate 13, with projecting flanges or ears 13ª, perforated to receive tie-bolts 17. The inner member comprises a cylindrical wall 16 and a funneled shaped bottom 14, terminating in a discharge nipple 15, for connection with the offtake pipe 18. The inner member telescopes inside of the outer member, and at its top and bottom peripheral portions is formed with slightly enlarged flanges 16ᵇ, fitting closely inside the outer member so as to leave a very slight annular space between these flanges and between the outside of the cylindrical wall 16 and the inside of the cylindrical wall 12 of the respective members. The outer member is provided at intervals around its periphery with longitudinal slots 12ª, and the inner member is provided with similar slots 16ª, the parts being assembled so that the slots of the two members, as shown in Figure 8, stand in staggered relation. Liquid seeping down through the bed of sand surrounding and covering these strainers will enter the slots 12ª of the outer member and find its way through a narrow arcuate passage to the adjacent slots 16ª in the inner member, the intervening space or passage being so narrow as to preclude the entrance of the particles of sand. The liquid that has thus passed through the two slotted walls has been completely filtered and will escape through the outlet orifice in the bottom of the strainer into the offtake pipe 18, any number of which may be provided to accommodate any desired number of filtering strainers in the tank.

After the accumulation of foreign matter retained by the filtering bed of sand, it becomes necessary to get rid of this by a washing process, in which case washing liquid is turned on in the reverse direction through the pipes 18 through certain connecting pipes and valves, common in this art and not here shown, and thus a reverse circulation of liquid is obtained. To thoroughly cleanse the sand a revolving rake 4, 4ª, is rotated which serves to agitate the liquid and stir up the sand so as to thoroughly loosen it and allow the wash water to have its full effect. The foreign particles, having thus been washed out of the sand, are carried off through an overflow pipe 20, arranged at the top of the tank above the level of the supply pipe and nozzle 11.

To drive the suspended particles in the wash water toward the overflow pipe, I provide a paddle 40 whose hub is mounted on a sleeve or bushing 41 on the central shaft 3, said hub carrying a driving sheave 42, around which passes a driving chain which then runs over the quarter-turn outlet pulley or sheave 43, which is driven by a clutch pulley indicated at 46. The bearing boxes 47, which carry the drive shaft 45, are adjustable on vertical standards to take up slack in the belt or driving cable 40ª.

To get rid of complications in locating the baffle or spray plate beside the supply nozzle, without interfering with the action of the agitating devices, I have mounted the baffle plate directly upon the revoluble rake. In consequence of this arrangement, means are provided for indicating the correct position of the rake to properly position the baffle plate with relation to the supply nozzle. This indicating means comprises an upstanding rod or pointer 6, on one end of the channel bar, comprising the backbone of the rake, and a fixed pointer or arrow 7, secured to the side-wall of the tank 1, directly over the nozzle. It will be observed in this connection that a worm and gear drive is provided for driving the rake-shaft so that the rake-shaft, when once set to proper position by reference to the indicating means or pointers, will be held by the stationary worm at rest so as to prevent accidental displacement from correct spraying position.

In order to deflect or guide the revolving agitated body of wash liquid into the overflow pipe, I provide an elbow-shaped scoop 21, mounted on a vertical axis so disposed as to allow either end of the scoop to spring against the side of the tank, leaving the other end projecting outward, according to the direction of revolution of the liquid body within the tank. This may be manipulated by a hand wheel 22, on the top axle, as shown in Figure 10, but I prefer also to provide an intermediate vane 23 which will be acted upon by the swirling liquid to shift the outlet scoop to proper position to deflect the liquid into the overflow pipe.

In order to guide the particles that are suspended in the liquid into the scoop, I provide, on each side of the scoop, in the position shown in Figure 1, guide-plates 25. These guide plates comprise an inclined plane 25$^b$ with its higher edge adjacent to the scoop but somewhat below the level of the scoop, and having an exterior flange or wing 25$^a$ for pulling against the inside wall of the tank.

To guide any scum or oil that floats on top of the wash liquid to the outlet, I provide a vertically adjustable skimmer, as shown in Figure 4. This comprises a depending plate 30 mounted on the angle-bar 31, extending from the outer bar inwardly of the tank at an angle of its periphery and adjustably supported by a pair of vertical screw rods 32, carried by suitable bearing brackets. The two screw rods 32 are interconnected by means of a sprocket chain 33, and one of them is provided with a handwheel 34, by turning which both screws are simultaneously rotated and adjusted vertically so as to set and retain the skimmer plate 30 at a proper level to deflect particles outwardly where they will pass into the overflow scoop and out of the tank.

The strainers provide a simple construction of large capacity that are easily cleaned. They may be made of any size and capacity and when made very large are provided with a top perforated ear or lug 13, into which the hoisting chain may be hooked to lift them out of the tank when they can be quickly disassembled, cleaned and replaced. By the use of the overflow scoop and the cooperating guides for deflecting foreign particles upward into the scoop, as well as the use of the skimmer and of the rotary paddle, which imparts a centrifugal tendency to the body of liquid, the washing operation can be performed very quickly and expeditiously, and therefore these become very important factors in increasing the efficiency and capacity of the filter.

What I claim is:

1. A strainer element for a granular bed filter embracing an outer longitudinally slotted annular shell, an inner longitudinally slotted shell of similar contour, annular spacing shoulders forming intervening arcuate passages between the two shells, end walls for each of said shells one of which is provided with an outlet passage to allow the escape of liquid penetrating to the interior through the slots in the shells, the respective slots being circumferentially offset in relation to one another.

2. A filtering strainer embracing in its construction a cylindrical shell closed at one end and having a series of spaced slots in its side wall, a similarly slotted shell constructed to telescope inside the first shell to leave an intervening space too narrow to admit filtering sand, an end head in each shell forming respectively the top and bottom of the strainer, fastening means for securing the two shells together with their slots in staggered relation, the end head of the inner shell having an outlet orifice.

3. A strainer for a filter bed of sand or the like embracing in its construction two telescopic cup-like members arranged in inverted relation, one inside the other, the lower having a discharge port in its bottom, the other having its inverted bottom imperforate, the side walls of each being slightly spaced apart to exclude sand while permitting the flow of liquid therethrough, each cup-like member being provided with lateral ports in circumferentially staggered relation to those of the other.

4. A strainer for a filter bed of sand or the like embracing upper and lower cup-like members having telescoping side walls separated by an annular space dimensioned to permit flow of liquid therethrough, but excluding sand grains, the upper member being closed at its upper end, the lower member being closed by a bottom head provided with a discharge port connected with an underneath pipe, each member having a series of lateral openings, the openings of one being in staggered relation to those of the others whereby the liquid entering the outer series of ports must flow through a portion of the narrow annular space before entering the ports of the inner member on its way to the outlet port.

5. A strainer for a filter bed of sand or the like embracing in its construction two annular shells, each provided with an integral end head projecting laterally beyond the annular walls of the respective shells, each annular wall being provided with a series of vertical slots in circumferentially staggered relation to those of the other shell when the two shells are telescoped together, means for spacing the inner shell from the outer shell to leave a narrow annular passage for the flow of liquid while excluding sand, means for tying the two end heads detachably together, the lower end head being provided with an outlet port for connection with the discharge pipe.

In witness whereof, I have subscribed the above specification.

ROBERT DANIEL TACKABERRY.